(12) United States Patent
Yoneda et al.

(10) Patent No.: US 11,009,417 B2
(45) Date of Patent: May 18, 2021

(54) PIEZORESISTIVE SENSOR

(71) Applicant: Azbil Corporation, Tokyo (JP)

(72) Inventors: Masayuki Yoneda, Tokyo (JP);
Hirofumi Tojo, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 158 days.

(21) Appl. No.: 16/290,215

(22) Filed: Mar. 1, 2019

(65) Prior Publication Data

US 2019/0285495 A1 Sep. 19, 2019

(30) Foreign Application Priority Data

Mar. 13, 2018 (JP) .............................. JP2018-045377

(51) Int. Cl.
*G01L 9/00* (2006.01)
(52) U.S. Cl.
CPC .................................. *G01L 9/0054* (2013.01)
(58) Field of Classification Search
CPC ........... G01L 9/0054; G01L 9/06; G01L 1/18; G01L 9/00; G01P 15/09; G01P 15/00
See application file for complete search history.

(56) References Cited

U.S. PATENT DOCUMENTS

| | | | | |
|---|---|---|---|---|
| 5,231,301 | A * | 7/1993 | Peterson | G01L 9/0054 257/364 |
| 8,387,458 | B2 | 3/2013 | Aida et al. | |
| 2007/0215966 | A1 | 9/2007 | Ikegami | |
| 2018/0266901 | A1 * | 9/2018 | Tanaka | G01L 1/183 |

FOREIGN PATENT DOCUMENTS

| | | |
|---|---|---|
| JP | S60-032993 A | 2/1985 |
| JP | H10-144934 A | 5/1998 |
| JP | 2011-013179 A | 1/2011 |
| JP | 5195102 B2 | 5/2013 |
| KR | 10-2007-0094453 A | 9/2007 |

OTHER PUBLICATIONS

Korean Intellectual Property Office, "Notification of Reason for Refusal," issued in Korean Patent Application No. 10-2019-0028689, which is a counterpart to U.S. Appl. No. 16/290,215, dated Nov. 16, 2020, 7 pages (4 pages of English translation of Office Action, and 3 pages of original Office Action).

* cited by examiner

*Primary Examiner* — Suman K Nath

(57) ABSTRACT

A piezoresistive sensor includes a piezoresistive region to which first conductivity type impurity has been introduced, the piezoresistive region being formed in a semiconductor layer; a protection region to which second conductivity type impurity has been introduced, the protection region covering a top of a region in which the piezoresistive region is formed, the protection region being formed in the semiconductor layer; and contact regions to which the first conductivity type impurities have been introduced, the contact regions being connected to the piezoresistive region, the contact regions being formed so as to reach a surface of the semiconductor layer except a region in which the protection region is formed, in which the following inequality holds: impurity concentration of the piezoresistive region<impurity concentration of the protection region<impurity concentrations of the contact regions.

7 Claims, 4 Drawing Sheets

PIEZORESISTIVE SENSOR

CROSS-REFERENCE TO RELATED APPLICATION

The present application claims the benefit of and priority to Japanese Patent Application No. 2018-045377, filed on Mar. 13, 2018, the entire contents of which are incorporated by reference herein.

TECHNICAL FIELD

The present invention relates to a piezoresistive sensor having a piezoresistive region on a diaphragm in a semiconductor layer.

BACKGROUND

A pressure sensor that outputs a pressure value based on, for example, the amount of deflection (that is, the displacement) of a pressurized diaphragm is widely used for industrial use such as semiconductor equipment. One of this type of pressure sensor is a piezoresistive sensor that detects the displacement of a diaphragm as a stress using piezoresistive effects and outputs a pressure value based on the detected stress. Such a piezoresistive sensor that uses piezoresistive effects has a device structure in which, generally, a piezoresistive region to which p-type impurities have been introduced is formed in a diaphragm formed on an n-type semiconductor substrate.

In addition, PTL 1 discloses a technique that forms, on the piezoresistive region described above, a protection region including a region to which n-type impurities have been introduced and covers the top of the piezoresistive region. A piezoresistive sensor (semiconductor pressure sensor) having such a device structure is insusceptible to the effect of contaminants such as sodium ions attached to the inside or surface of an insulating protection film (for example, silicon dioxide) provided on the surface of a semiconductor substrate and can achieve highly accurate and highly sensitive sensor operating characteristics by stabilizing the piezoresistive region.

CITATION LIST

Patent Literature

[PTL 1] JP-B-60-32993
[PTL 2] JP-A-2011-013179

SUMMARY

By the way, when the concentration of p-type impurities in the piezoresistive region are reduced to improve the sensitivity of the piezoresistive region, an electrical connection between the piezoresistive region and electrodes becomes difficult. Accordingly, an electrical connection between the electrodes and the piezoresistive region is achieved by forming contact regions that are connected to a piezoresistive region and include higher concentration p-type impurities and electrically connecting the electrodes (ohmic connections) to the contact regions (see PTL 2).

However, even if an attempt is made to form an n-type impurity region (protection region) on the surface of the piezoresistive region (high concentration p-type impurity region and low concentration p-type impurity region) to completely cover the p-type impurity regions with the protection region, it is very difficult to reverse (conversion to an n-type impurity region) the surfaces of the contact regions including the high concentration p-type impurity regions. If the concentration of n-type impurities in the protection region is increased, since a pn junction is formed between this region and the high concentration p-type impurity region, this break-down voltage (opposite direction withstand voltage) is reduced and a new problem occurs in that practicality is lost.

As described above, related art cannot easily cover the piezoresistive region with the protection region and the operating characteristics of the piezoresistive sensor becomes unstable, thereby narrowing, for example, the use temperature range.

The invention addresses the above problems with an object of making the operating characteristics of a piezoresistive sensor more stable.

A piezoresistive sensor according to the invention comprises a piezoresistive region to which a first conductivity type impurity has been introduced, the piezoresistive region being formed in a semiconductor layer; a protection region to which a second conductivity type impurity has been introduced, the protection region covering a top of a region in which the piezoresistive region is formed, the protection region being formed in the semiconductor layer; and contact regions to which the first conductivity type impurity has been introduced, the contact regions being connected to the piezoresistive region, the contact regions being formed so as to reach a surface of the semiconductor layer except a region in which the protection region is formed, in which the following inequality holds: an impurity concentration of the piezoresistive region<an impurity concentration of the protection region<an impurity concentrations of the contact regions.

The piezoresistive sensor described above further comprises electrodes that make ohmic connections to the contact regions near the surface of the semiconductor layer.

In the piezoresistive sensor described above, the semiconductor layer may comprise, for example, silicon.

In the piezoresistive sensor described above, each of the contact regions comprises a first contact region that is connected to the piezoresistive region and a second contact region that reaches the surface of the semiconductor layer and the following inequality holds: the impurity concentration of the piezoresistive region<the impurity concentration of the protection region<an impurity concentration of the first contact region<an impurity concentration of the second contact region.

The piezoresistive sensor described above further comprises a diaphragm formed in the semiconductor layer, the diaphragm being thinner than surroundings, in which the piezoresistive region is formed on the diaphragm. For example, the diaphragm is formed in a rectangle in plan view and the four piezoresistive regions are disposed in individual edges of the diaphragm.

In the piezoresistive sensor described above, n-type impurities may be phosphorus and p-type impurities may be boron.

In the piezoresistive sensor described above, the semiconductor layer may comprise silicon.

As described above, since the invention forms the second conductivity type protection region so as to cover the top of the first conductivity type piezoresistive region and forms the first conductivity type contact regions connected to the piezoresistive region and the following inequality holds: the impurity concentration of the piezoresistive region<the impurity concentration of the protection region<the impurity concentration of the contact regions, excellent effects can be obtained in that the operating characteristics of the piezoresistive sensor becomes more stable.

DETAILED DESCRIPTION

Embodiments of the invention will be described below.

Embodiment 1

Figure 1:
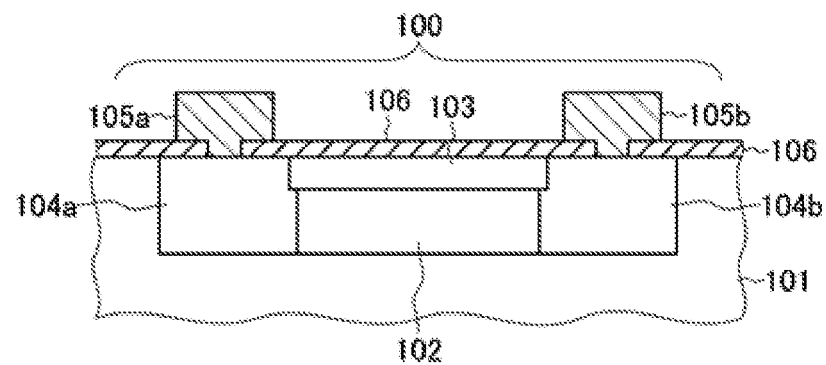
FIG. 1 is a cross-sectional view illustrating a structure of a piezoresistive sensor according to embodiment 1 of the invention.

First, a piezoresistive sensor according to embodiment 1 of the invention will be described with reference to FIG. 1. The piezoresistive sensor according to embodiment 1 has a piezoresistive region 102, a protection region 103, contact regions 104a and 104b, and electrodes 105a and 105b in a device region 100.

The piezoresistive region 102 is a region that is formed in a semiconductor layer 101 and to which first conductivity type impurities have been introduced. The semiconductor layer 101 comprises, for example, silicon. The semiconductor layer 101 is, for example, a part near the surface of the silicon substrate. Alternatively, the semiconductor layer 101 may be a surface silicon layer of a well-known SOI (Silicon on Insulator). In addition, the first conductivity type is, for example, a p-type. The piezoresistive region 102 is a p-type region obtained by introducing boron (B) that functions as p-type impurities to the semiconductor layer 101 made of silicon.

In addition, the protection region 103 is a region that is formed in the semiconductor layer 101 so as to cover the top of the region comprising the piezoresistive region 102 and to which second conductivity type impurities have been introduced. The second conductivity type is, for example, an n-type. The protection region 103 is an n-type region obtained by introducing phosphorus (P) that functions as n-type impurities to the semiconductor layer 101 made of silicon.

In addition, the protection region 103 covers the entire area of the piezoresistive region 102 in plan view. The area of the protection region 103 is equal to or more than the area of the piezoresistive region 102 in plan view. It should be noted here that the protection region 103 only needs to be formed closer to the surface of the semiconductor layer 101 than the piezoresistive region 102 in the thickness direction of the semiconductor layer 101. The protection region 103 does not need to make contact with the piezoresistive region 102.

In addition, the contact regions 104a and 104b are regions that are connected to the piezoresistive region 102 and formed so as to reach the surface of the semiconductor layer 101 except the region in which the protection region 103 is formed and to which the first conductivity type (for example, p-type) impurities have been introduced. The electrodes 105a and 105b make ohmic connections to the contact regions 104a and 104b, respectively, near the surface of the semiconductor layer 101. The electrodes 105a and 105b are made of metal such as, for example, gold (Au), copper (Cu), or aluminum (Al).

In addition, the piezoresistive sensor according to embodiment 1 meets the following inequality: "the impurity concentration of the piezoresistive region 102<the impurity concentration of the protection region 103<the impurity concentrations of the contact regions 104a and 104b". It should be noted here that these types of impurities can be introduced by, for example, a well-known ion implantation method.

It should be noted here that an insulating layer 106 comprising an insulating material, such as silicon oxide, is formed on the surface of the semiconductor layer 101 in embodiment 1. The electrodes 105a and 105b are formed on the insulating layer 106 and make ohmic connection to the contact regions 104a and 104b by penetrating through the insulating layer 106.

In a piezoresistive sensor having such a device structure, even when contaminants (positive ions), such as sodium ions, are attached to the surface, electrical effects can be limited within the protection region 103 disposed near the surface of the semiconductor layer 101. Accordingly, the piezoresistive region 102 disposed in a position deeper than the protection region 103 does not suffer the effect of the contaminants.

In addition, the impurity concentrations of the contact regions 104a and 104b are higher than the impurity concentration of the piezoresistive region 102 and higher enough to make ohmic connections to the electrodes 105a and 105b. Accordingly, even when the contaminants described above are attached to the contact regions 104a and 104b, large depletion layers are not formed in the regions, so the effect of contaminants can be reduced sufficiently.

More detailed descriptions will be given. If contaminants, such as sodium ions, are present near the surface of the piezoresistive region, the contaminants cause instability. In the case of most general piezoresistance including a p-type impurity region, presence of sodium ions or the like forms a depletion region on a surface layer part of the piezoresistive region or an inversion layer is formed depending on the impurity concentration of the piezoresistive region.

When a depletion region or an inversion layer is formed as described above, the sheet resistance changes. This problem causes fluctuations in the resistance value of the piezoresistive region. As a result, a phenomenon such as reduction in output accuracy or instability of output of the sensor is caused. Here, the threshold voltage $V_{th}$ for forming an inversion layer is represented by the following expression. When the piezoresistive region is formed using a p-type, the impurity concentration of the piezoresistive region equals $N_A$ and the threshold voltage $V_{th}$ has dependence on the impurity concentration of the piezoresistance region. In addition, electric charge due to sodium ions has the same effect on $V_{th}$. Accordingly, the piezoresistive region having a lower impurity concentration is more likely to suffer the effect of the operating electric charge of sodium ions or the like. At a concentration close to $10^{18}$ cm$^{-3}$ at which the piezoresistive region is most sensitive, the electric charge amount equivalent to only several volts has effects.

$$Vth = \sqrt{\frac{4qN_A \phi_F \varepsilon_{Si}}{\varepsilon_{ox}^2 \varepsilon_0}} \cdot x_{ox} + 2\phi_F + V_{FB}$$ [Math. 1]

$$\phi_F = \frac{kT}{q} \ln \frac{N_A}{n_i}$$

$N_A$: Acceptor impurity concentration
q: Electric charge amount
$\varepsilon_{Si}$: Relative permittivity of silicon
$\varepsilon_{OX}$: Relative permittivity of oxidized film
$\varepsilon_0$: Permittivity of vacuum
k: Boltzmann constant
$n_i$: Intrinsic semiconductor carrier concentration
$X_{OX}$: Thickness of oxidized film
$\phi_F$: Difference between Fermi level and forbidden band median level
$V_{FB}$: Flat band voltage When the impurity concentration of the piezoresistive region is simply increased for contact with the electrodes, if a protection region of a different conductivity type is formed by an ion implantation method, the entire area of the piezoresistive region cannot be practically covered with the protection region. An ion implantation method reduces the impurity concentration of a peripheral part in a halfway manner and ions that are contaminants are likely to have effects as described above. Alternatively, if the protection region is formed in a higher concentration impurity region to suppress the effects, the break-down voltage are significantly reduced, so this is impossible practically.

In contrast, since the embodiment meets the following inequality as described above: "the impurity concentration of the piezoresistive region 102<the impurity concentration of the protection region 103<the impurity concentrations of the contact regions 104a and 104b", the problems described above are suppressed, changes in the sheet resistances in the piezoresistive region 102 and the contact regions 104a and 104b are suppressed to the minimum, and a highly sensitive piezoresistive sensor having stable operating characteristics can be achieved. The piezoresistive sensor according to embodiment 1 as described above can be used as, for example, a pressure sensor or an acceleration sensor.

Figure 2:
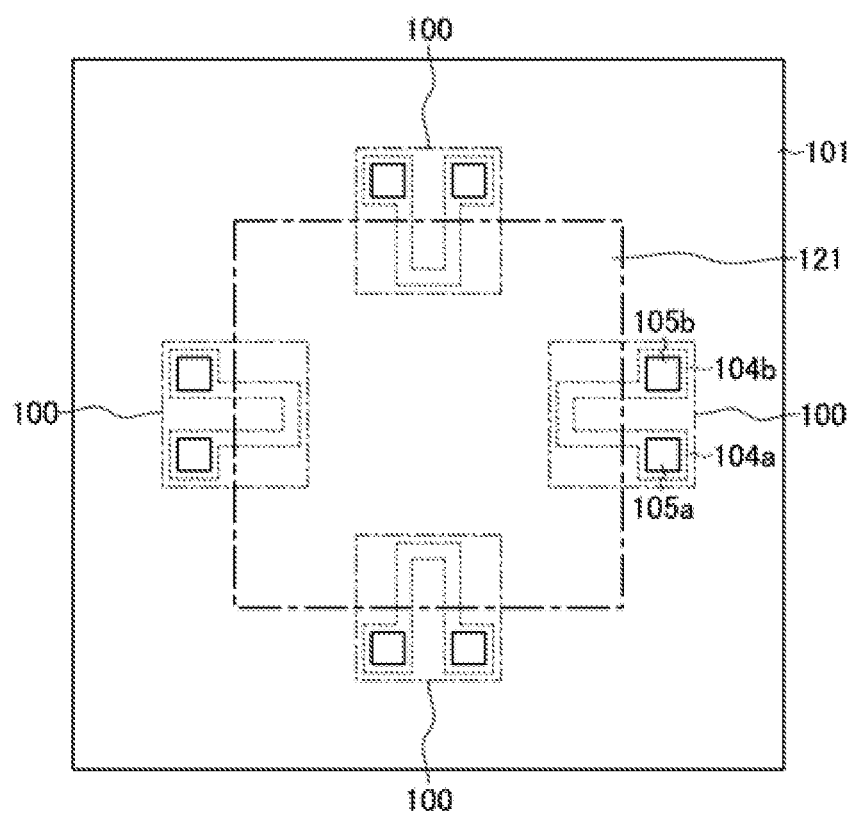
FIG. 2 is a plan view illustrating the structure of piezoresistive sensor according to embodiment 1 of the invention.

For example, when a diaphragm 121 that is thinner than surroundings and rectangular in plan view is formed on the semiconductor layer 101, four device regions 100 are disposed so that piezoresistive regions are disposed on four edges of the diaphragm 121, and the four piezoresistive regions are bridge-connected as illustrated in FIG. 2, a pressure sensor having the diaphragm 121 as a pressure reception part can be obtained. The pressure can be detected by detecting, as the bridge output, changes in the resistance values of the four piezoresistive regions caused by the deformation of the diaphragm 121 having received a pressure. An acceleration sensor has substantially the same structure.

Embodiment 2

Figure 3:
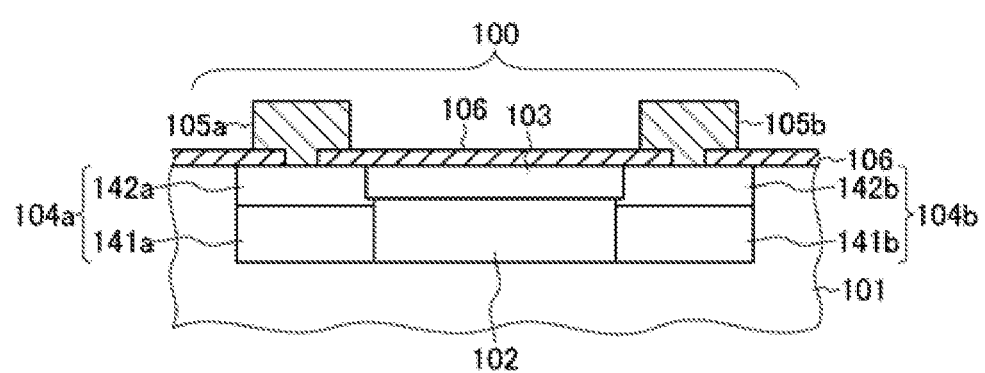
FIG. 3 is a cross-sectional view illustrating the structure of a piezoresistive sensor according to embodiment 2 of the invention.

Next, a piezoresistive sensor according to embodiment 2 of the invention will be described with reference to FIG. 3. The piezoresistive sensor according to embodiment 2 has the piezoresistive region 102, the protection region 103, the contact regions 104a and 104b, and the electrodes 105a and 105b in the device region 100. In addition, the insulating layer 106 is formed on the surface of the semiconductor layer 101. This structure is the same as in embodiment 1 described above.

In embodiment 2, the contact region 104a has a first contact region 141a that is connected to the piezoresistive region 102 and a second contact region 142a that reaches the surface of the semiconductor layer 101. Similarly, the contact region 104b has a first contact region 141b that is connected to the piezoresistive region 102 and a second contact region 142b that reaches the surface of the semiconductor layer 101. In embodiment 2, the electrodes 105a and 105b make ohmic connections to the second contact regions 142a and 142b, respectively, near the surface of the semiconductor layer 101.

In addition, the following inequality holds: the impurity concentration of the piezoresistive region 102<the impurity concentration of the protection region 103<the impurity concentrations of the first contact regions 141a and 141b<the impurity concentrations of the second contact regions 142a and 142b.

The first contact regions 141a and 141b are formed at a depth in the thickness direction of the semiconductor layer 101 that is approximately the same as in the piezoresistive region 102. The first contact region 141a is formed so as to make contact with one end side of the piezoresistive region 102 and the first contact region 141b is formed on the other end side of the piezoresistive region 102 in plan view.

In addition, the second contact regions 142a and 142b are formed at a depth in the thickness direction of the semiconductor layer 101 that is approximately the same as in the protection region 103.

According to embodiment 2, it is possible to make ohmic connections between the contact regions 104a and 104b and the electrodes 105a and 105b more preferably without significantly increasing the difference between the impurity concentrations of the contact portions between the piezoresistive region 102 and the contact regions 104a and 104b. According to embodiment 2, the impurity concentrations of the paths from the piezoresistive region 102 to the second contact regions 142a and 142b through the first contact regions 141a and 141b can change gently.

The manufacturing method for the piezoresistive sensor according to embodiment 2 will be described below with reference to FIG. 4A to FIG. 4E.

Figure 4A:
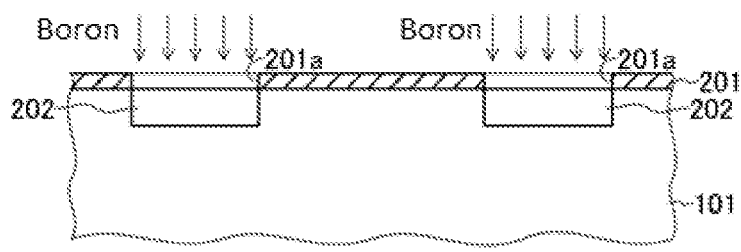
FIG. 4A is a cross-sectional view illustrating the state of an intermediate process in the description of a manufacturing method for the piezoresistive sensor according to embodiment 2 of the invention.

First, an inorganic mask layer 201 having opening portions 201a is formed on the semiconductor layer 101, as illustrated in FIG. 4A. The opening portions 201a are disposed in positions in which the contact regions 104a and 104b are formed. For example, a silicon oxide layer is formed on the semiconductor layer 101 by depositing an inorganic insulating material such as silicon oxide ($SiO_2$) using a deposition method such as a sputtering method or a CVD (Chemical Vapor Deposition) method. Next, it is enough to form the opening portions 201a and provide the inorganic mask layer 201 by patterning the formed silicon oxide layer using a known photo lithography technique and etching technique. When the semiconductor layer 101 is made of silicon, the silicon oxide layer may be formed by thermally oxidizing this surface. In etching, the opening portions 201a can be formed by selectively etching silicon oxide via wet etching using, for example, hydrofluoric acid (HF) as an etchant.

Next, a p-type impurity region 202 is formed by selectively ion-implanting boron in the semiconductor layer 101 using the inorganic mask layer 201 in a well-known ion implantation method. Here, ion implantation is performed with predetermined implantation energy so that p-type impurities are introduced to a depth approximately the same as the depth of the regions in which the second contact regions 142a and 142b are formed.

Figure 4B:
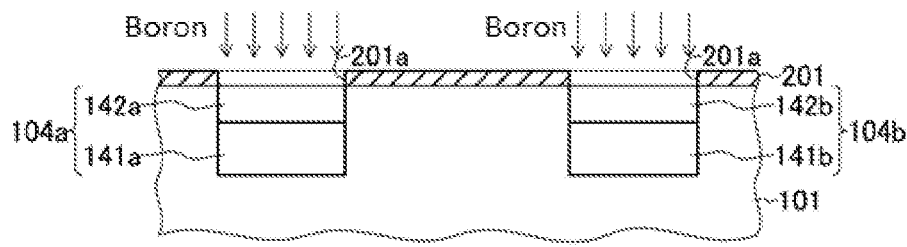
FIG. 4B is a cross-sectional view illustrating the state of an intermediate process in the description of the manufacturing method for the piezoresistive sensor according to embodiment 2 of the invention.

Next, as illustrated in FIG. 4B, the first contact regions 141a and 141b and the second contact regions 142a and 142b are formed by selectively ion-implanting boron again in the semiconductor layer 101 using the inorganic mask layer 201 in the ion implantation method. In this process, ion implantation is performed with predetermined implantation energy so that p-type impurities are introduced to a depth approximately the same as the depth at which the first contact regions 141a and 141b are formed.

By performing ion implantation as described above twice, impurities are introduced twice to the second contact regions 142a and 142b (p-type impurity regions 202) and the impurity concentrations become higher. When an attempt is made to form the contact regions 104a and 104b by performing ion implantation once, the impurity concentration near the surface of the semiconductor layer 101 does not easily become high. However, when ion implantation is performed twice as described above, the impurity concentration near the surface can become sufficiently high.

Figure 4C:
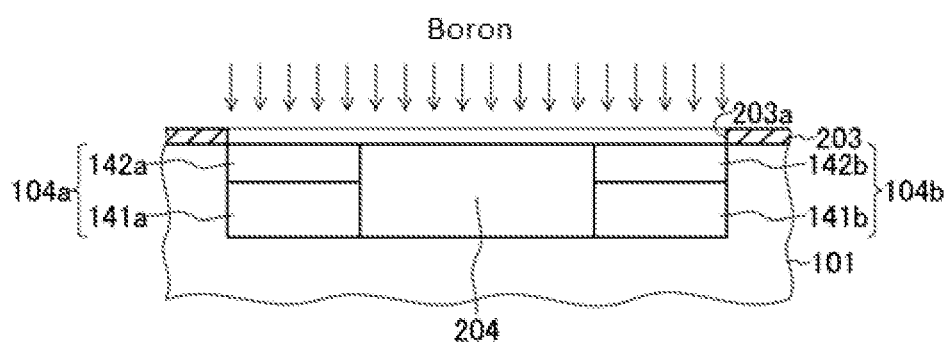
FIG. 4C is a cross-sectional view illustrating the state of an intermediate process in the description of the manufacturing method for the piezoresistive sensor according to embodiment 2 of the invention.

Next, an inorganic mask layer 203 having an opening portion 203a is formed on the semiconductor layer 101, as illustrated in FIG. 4C. The opening portion 203a is disposed in a position in which the piezoresistive region 102 and the contact regions 104a and 104b are formed. Here, the region of the opening portion 203a includes the regions of the opening portions 201a of the inorganic mask layer 201 described above. Accordingly, for example, it is enough to provide the inorganic mask layer 203 by newly forming the opening portion 203a in the inorganic mask layer 201. It should be noted here that the inorganic mask layer 203 may also be newly formed by performing the operation described above after removing the inorganic mask layer 201.

Next, a p-type impurity region 204 is formed by selectively ion-implanting boron again in the semiconductor layer 101 using the inorganic mask layer 203 in the ion implantation method. Here, ion implantation is performed with predetermined energy so that p-type impurities are introduced to a depth approximately the same as the depth of the region in which the piezoresistive region 102 is formed. The p-type impurity region 204 is a region that becomes the piezoresistive region 102.

Figure 4D:
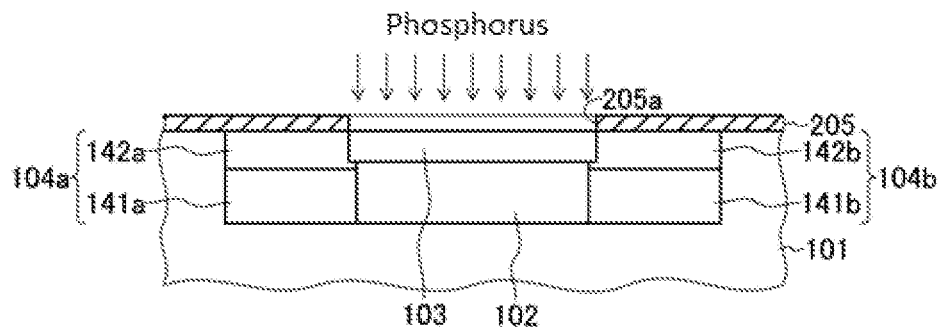
FIG. 4D is a cross-sectional view illustrating the state of an intermediate process in the description of the manufacturing method for the piezoresistive sensor according to embodiment 2 of the invention.

Next, after the inorganic mask layer 203 is removed, an inorganic mask layer 205 having an opening portion 205a is formed on the semiconductor layer 101, as illustrated in FIG. 4D. The opening portion 205a is disposed in a position in which the protection region 103 is formed. In the same way as above, it is enough to form a silicon oxide layer on the semiconductor layer 101 and form opening portion 205a and provide the inorganic mask layer 205 by patterning the formed silicon oxide layer using a known photo lithography technique and etching technique.

Next, the protection region 103, which is an n-type impurity region, is formed by selectively ion-implanting phosphorus in the semiconductor layer 101 using the inorganic mask layer 205 in the ion implantation method. This forms the protection region 103 so as to cover the top of the piezoresistive region 102, which is a p-type impurity region. Here, ion implantation is performed with predetermined energy so that n-type impurities are introduced approximately to the depth of the region in which the protection region 103 is formed.

In forming the impurity introduction region described above, heat processing for activating implanted ions is performed after ion implantation.

Figure 4E:
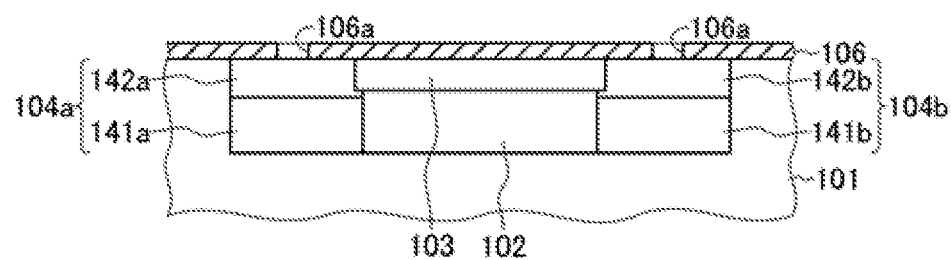
FIG. 4E is a cross-sectional view illustrating the state of an intermediate process in the description of the manufacturing method for the piezoresistive sensor according to embodiment 2 of the invention.

Next, after the inorganic mask layer 205 is removed, the insulating layer 106 is formed and through-holes 106a are formed in the insulating layer 106, as illustrated in FIG. 4E. The insulating layer 106 is formed by, for example, depositing silicon oxide using a predetermined deposition method. Next, it is enough to form through-holes 106a by patterning the formed insulating layer 106 using a known photo lithography technique and etching technique.

After that, a mask pattern (not illustrated) having opening portions in the region in which the electrodes 105a and 105b are formed is formed on the insulating layer 106 and a metal film is formed by depositing predetermined metal on this mask pattern. For example, a well-known vapor deposition method or plating method may be used to form the metal film. Next, the electrodes 105a and 105b are formed by removing (lifting off) the mask pattern, as illustrated in FIG. 3.

Next, the concentration profiles in the depth direction of the semiconductor layer 101 of the individual impurity introduction regions will be described with reference to FIG. 5. The impurity concentrations of the individual impurity introduction regions change depending on their depths and have the profiles as illustrated in FIG. 5.

Figure 5:
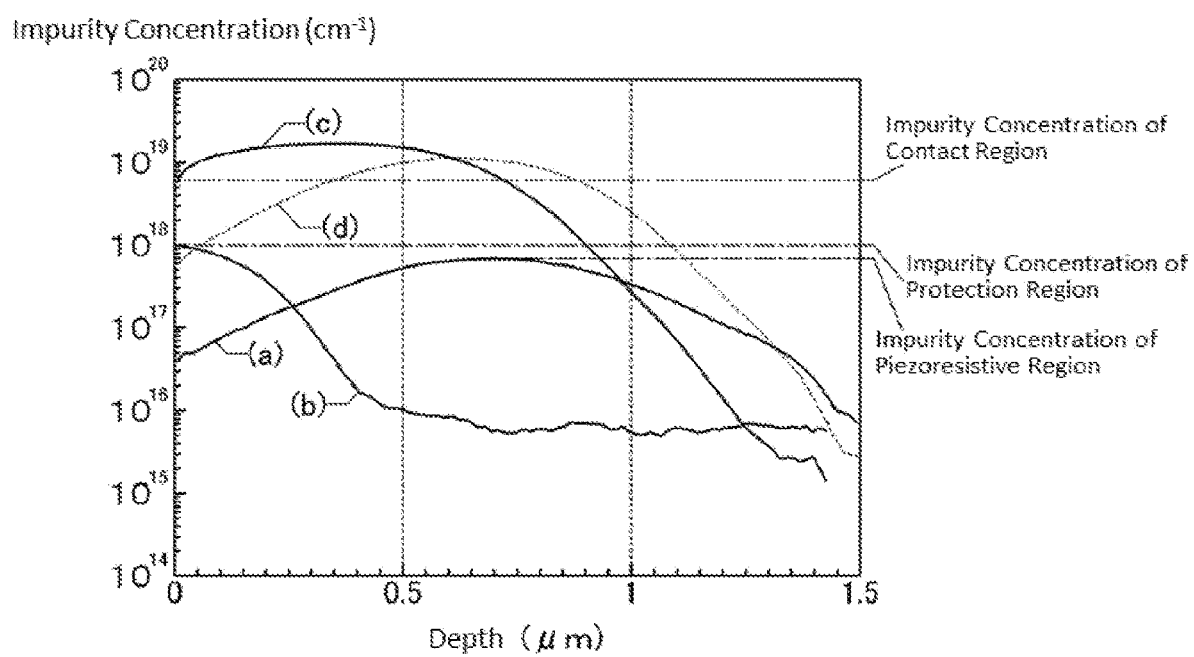
FIG. 5 is a characteristic diagram illustrating concentration profiles in a thickness direction of individual impurity introduction regions.

In FIG. 5, characteristic (a) represents the concentration profile of p-type impurities in the region of the piezoresistive region 102 (protection region 103) in plan view. Characteristic (b) represents the concentration profile of n-type impurities in the region of the protection region 103 (piezoresistive region 102) in plan view.

In addition, in FIG. 5, characteristic (c) represents the concentration profile of p-type impurities in the regions of the contact regions 104a and 104b (embodiment 2) formed by performing ion implantation twice in plan view. In addition, in FIG. 5, characteristic (d) represents the concentration profile of p-type impurities in the regions of the contact regions 104a and 104b (embodiment 1) formed by performing ion implantation once in plan view.

As illustrated in FIG. 5, the impurity concentrations of the impurity regions formed by ion implantation change depending on their depths. Accordingly, in the piezoresistive region 102, a setting is made so that the impurity peak concentration becomes "IMPURITY CONCENTRATION OF PIEZORESISTIVE REGION" indicating a predetermined sensitivity at a predetermined depth.

In addition, in the protection region 103, the concentration of the region of "IMPURITY CONCENTRATION OF PROTECTION REGION" near the surface is set to become higher than "IMPURITY CONCENTRATION OF PIEZORESISTIVE REGION" so that the formation region of the piezoresistive region 102 is positioned below the region of "IMPURITY CONCENTRATION OF PROTECTION REGION" and the region of "IMPURITY CONCEN- TRATION OF PROTECTION REGION" completely covers the region of the piezoresistive region 102.

By the way, when the contact regions 104a and 104b are formed by performing ion implantation once, even if the regions are set to become higher than "IMPURITY CONCENTRATION OF PIEZORESISTIVE REGION" at a predetermined depth, the impurity concentration near the surface is generally reduced as illustrated by characteristic (d). In contrast, when the contact regions 104a and 104b are formed by performing ion implantation twice, as illustrated by characteristic (c), the concentration becomes higher than "IMPURITY CONCENTRATION OF PIEZORESISTIVE REGION" at a predetermined depth and the impurity concentration can become sufficiently high even near the surface.

As is clear from the above description, by forming the individual impurity regions by performing ion implantation multiple times, the states of desired concentration distributions in the piezoresistive region 102, the protection region 103, and the contact regions 104a and 104b can be achieved more easily. As described above, the individual impurity regions of the piezoresistive sensor in embodiment 2 described above can be formed more easily and effectively by use of the ion implantation method.

As described above, according to the invention, the second conductivity type protection region is formed so as to cover the top of the first conductivity type piezoresistive region, the first conductivity type contact regions connected to the piezoresistive region are formed, and the following inequality holds: the impurity concentration of the piezoresistive region<the impurity concentration of the protection region<the impurity concentration of the contact regions, so the operating characteristics of the piezoresistive sensor become more stable.

It should be noted here that the invention is not limited to the embodiments described above and it will be appreciated that persons having common knowledge in this field may make many modifications and combinations within the technical concept of the invention. For example, it will be appreciated that the first conductivity type may be the n-type and the second conductivity type may be the p-type. In addition, the semiconductor layer may be made of other semiconductors instead of silicon. In addition, the individual impurity regions may be formed by a well-known diffusion method instead of an ion implantation method.

Description of Reference Numerals and Signs

100: device region, 101: semiconductor layer, 102: piezoresistive region, 103: protection region, 104a, 104b: contact region, 105a, 105b: electrode, 106: insulating layer

The invention claimed is:

1. A piezoresistive sensor comprising:
 a piezoresistive region to which first conductivity type impurity has been introduced, the piezoresistive region being formed in a semiconductor layer;
 a protection region which is formed on a surface side of the semiconductor layer from the piezoresistive region in the thickness direction of the semiconductor layer and to which second conductivity type impurity has been introduced, the protection region covering a top of the piezoresistive region, the protection region being formed in the semiconductor layer; and
 contact regions to which the first conductivity type impurity has been introduced, the contact regions being connected to the piezoresistive region, the contact regions being formed so as to reach a surface of the semiconductor layer except a region in which the protection region is formed,
 wherein the following inequality holds: impurity concentration of the piezoresistive region<impurity concentration of the protection region<impurity concentrations of the contact regions.

2. The piezoresistive sensor according to claim 1, further comprising:
 electrodes that make ohmic connections to the contact regions near the surface of the semiconductor layer.

3. The piezoresistive sensor according to claim 1, wherein each of the contact regions comprises a first contact region that is connected to the piezoresistive region and a second contact region that reaches the surface of the semiconductor layer, and
 the following inequality holds: the impurity concentration of the piezoresistive region<the impurity concentration of the protection region<impurity concentration of the first contact region<impurity concentration of the second contact region.

4. The piezoresistive sensor according to claim 1, further comprising:
 a diaphragm formed in the semiconductor layer,
 wherein the piezoresistive region is formed on the diaphragm.

5. The piezoresistive sensor according to claim 4, wherein the diaphragm is formed in a rectangle in plan view, and
 the piezoresistive region comprises four piezoresistive regions that are disposed in individual edges of the diaphragm.

6. The piezoresistive sensor according to claim 1, wherein the first conductivity type impurity is a p-type impurity boron and
 the second conductivity type impurity is an n-type impurity phosphorus.

7. The piezoresistive sensor according to claim 1, wherein the semiconductor layer comprises silicon.

* * * * *